US010416498B2

(12) United States Patent
Liao

(10) Patent No.: US 10,416,498 B2
(45) Date of Patent: Sep. 17, 2019

(54) REDUCING FRINGE FIELD EFFECT FOR SPATIAL LIGHT MODULATOR

(71) Applicant: Hong Kong Applied Science and Technology Research Institute Company Limited, Hong Kong (HK)

(72) Inventor: Cheng-Hsing Liao, Taiwan (TW)

(73) Assignee: Hong Kong Applied Science and Technology Research Institute Company Limited, Hong Kong (CN)

( * ) Notice: Subject to any disclaimer, the term of this patent is extended or adjusted under 35 U.S.C. 154(b) by 0 days.

(21) Appl. No.: 15/377,348

(22) Filed: Dec. 13, 2016

(65) Prior Publication Data
US 2018/0164643 A1 Jun. 14, 2018

(51) Int. Cl.
G02F 1/1335 (2006.01)
G02F 1/1337 (2006.01)
G02F 1/135 (2006.01)

(52) U.S. Cl.
CPC ........ G02F 1/133753 (2013.01); G02F 1/135 (2013.01); G02F 1/133707 (2013.01);
(Continued)

(58) Field of Classification Search
CPC ........ G02F 1/133553; G02F 1/133753; G02F 1/133723; G02F 1/13439
See application file for complete search history.

(56) References Cited

U.S. PATENT DOCUMENTS 5,914,802 A * 6/1999 Stappaerts ........ G02F 1/133553
359/276
6,642,983 B2 11/2003 Liu et al.
(Continued)

FOREIGN PATENT DOCUMENTS

CN 103116228 A 5/2013
CN 103383509 A 11/2013
(Continued)

OTHER PUBLICATIONS

H.-S. Kwok and Y.-W. Li, "Nanostructured alignment layers and their applications," Eurodisplay 2009, p. 135-138, 2009.
(Continued)

*Primary Examiner* — Dung T Nguyen
(74) *Attorney, Agent, or Firm* — Norton Rose Fulbright US LLP

(57) ABSTRACT

A spatial light modulator (SLM) configured to reduce a fringe field effect (FFE) is provided. The SLM comprises pixels each having a liquid crystal (LC) on a pixel region. At least one pixel is an optimized pixel. The LC of the optimized pixel has an inhomogeneous distribution of pretilt angle or anchoring energy over the pixel region. The inhomogeneous distribution is selected to oppose the FFE. In one embodiment, the optimized pixel is partitioned into an outer region and an interior region. The outer region is an area between the optimized-pixel boundary and a pre-determined distance inwardly therefrom. The inhomogeneous distribution has one value of the pretilt angle or anchoring energy over the outer region and another value over the interior region. In another embodiment, a polymer stabilized network with an inhomogeneous polymerization degree over the pixel region is used to configure the LC layer to oppose the FFE.

6 Claims, 6 Drawing Sheets

(52) U.S. Cl.
CPC .......... *G02F 1/133788* (2013.01); *G02F 2001/133761* (2013.01); *G02F 2203/12* (2013.01)

(56) References Cited

U.S. PATENT DOCUMENTS

| | | | |
|---|---|---|---|
| 7,233,377 B2 | 6/2007 | Liao et al. | |
| 9,588,379 B2* | 3/2017 | Park | G02F 1/13394 |
| 2002/0135724 A1* | 9/2002 | Chen | G02F 1/133707 |
| | | | 349/129 |
| 2002/0163610 A1 | 11/2002 | Liao et al. | |
| 2003/0147033 A1* | 8/2003 | Stalder | G02F 1/133753 |
| | | | 349/129 |
| 2007/0052889 A1 | 3/2007 | Whitehead, Jr. et al. | |
| 2015/0002795 A1 | 1/2015 | Li et al. | |
| 2015/0293409 A1* | 10/2015 | Usukura | G02F 1/1337 |
| | | | 349/15 |

FOREIGN PATENT DOCUMENTS

| | | |
|---|---|---|
| CN | 103645591 A | 3/2014 |
| CN | 103838041 A | 6/2014 |
| CN | 105849628 A | 8/2016 |

OTHER PUBLICATIONS

C. Y. Lee, M. C. Tseng, J. Y. L. Ho and H. S. Kwok, "Variable Liquid Crystal Pretilt Angle using Nano-Alignment Surfaces," SID2012 Digest, pp. 289-292, 2012.

K.-H. F. Chiang, S.-T. Wu and S.-H. Chen, "Fringing Field Effect of the Liquid-Crystal-on-Silicon Devices," Japan Journal of Applied Physics, vol. 41 (2002), pp. 4577-4585, part 1, No. 7A, Jul. 2002.

International Search Report and Written Opinion of PCT application No. PCT/CN2016/112305 issued from the International Search Authority dated Aug. 29, 2017.

* cited by examiner

REDUCING FRINGE FIELD EFFECT FOR SPATIAL LIGHT MODULATOR

FIELD OF THE INVENTION

The present invention generally relates to a spatial light modulator (SLM). The present invention relates to such SLM having optimized pixels for reducing a fringe field effect (FFE), also known as Disclination, or Flyback zone.

BACKGROUND

A SLM is an optical device for modulating an amplitude, phase or polarization of a light wave in space and in time. The SLM has a number of applications in different fields, e.g., data storage using a holographic method to encode information into a laser beam, realization of a Wavelength Select Switch (WSS) and use in Photolithography.

One practical realization of the SLM is based on the liquid crystal on silicon (LCOS) technology. In the SLM, a liquid crystal (LC) layer is positioned between a transparent electrode layer and a reflecting electrode layer, where the reflecting electrode comprises an array of pixel electrodes and is built on a silicon substrate. When a voltage difference is applied between the transparent electrode layer and one pixel electrode, LC molecules therebetween are re-orientated with an applied electric field. Since the LC is birefringent, i.e. having a refractive index that depends on the polarization and propagation direction of light in the LC, the orientation results in a phase shift, commonly known as a phase retardation, to the light where the phase retardation is controllable by the voltage difference due to the Electric Controlled Birefringence Effect, (ECB Mode).

One undesirable factor that leads to uncertainty in the amount of phase retardation that is produced is a FFE. The FFE is that the electric field generated at the boundary of a pixel electrode leaks to a neighboring pixel, affecting the LC alignment at the neighboring pixel and thereby generating unwanted phase shift to the light incident on the neighboring pixel. The unwanted phase shift is different at different places on the neighboring pixel, and is most pronounced around the boundary of the neighboring pixel. As the presence of FFE can significantly deteriorate the SLM performance, such as a considerable reduction of diffraction efficiency and phase profile accuracy, it is advantageous if the FFE can be substantially reduced.

In the art, there are several techniques for reducing the FFE. CN103645591 teaches inserting an additional electrode between two adjacent pixel electrodes so as to shield the electric field generated by one pixel from influencing another pixel. However, non-uniformity in the resultant electric field impacts the LC orientation, causing a phase curve error. In US20070052889, corners of a pixel electrode are rounded in order to reduce the electric fields generated at the corners. Instead of using a rectangular pixel electrode, US20150002795 teaches using a non-rectangular pixel electrode to compensate for the FFE by changing the electric field around the edge of the pixel electrode. While the last two techniques can reduce the FFE to a certain extent, the reduction may not be sufficient for certain practical applications as the extent of structural change made to the pixel electrode is constrained by the size thereof and there is a trend of shrinking the electrode size. There remains a need in the art for an improved technique to reduce the FFE.

SUMMARY OF THE INVENTION

The present invention provides a SLM for modulating incident light. The SLM reduces a FFE by configuring a LC layer of the SLM to exhibit an inhomogeneous distribution of a FFE-opposing feature over a pixel electrode without a need to modify a shape of the pixel electrode. A usable set of FFE-opposing features comprises a pretilt angle and an anchoring energy.

The SLM comprises a transparent electrode layer, a reflecting electrode layer, and a LC layer positioned between the transparent electrode layer and the reflecting electrode layer. The reflecting electrode layer comprises plural pixel electrodes such that plural pixels are created. An individual pixel electrode has a pixel region bounded by a boundary of the individual pixel electrode. An individual pixel is formed as a portion of the LC layer overlaying the pixel region of the individual pixel electrode. At least one of the pixels is realized as an optimized pixel, and most preferably each of the pixels is realized as the optimized pixel. The portion of the LC layer in the optimized pixel has an inhomogeneous distribution of FFE-opposing feature over the pixel region, the inhomogeneous pretilt-angle distribution being selected to oppose the FFE induced by plural neighboring pixels immediately adjacent to the optimized pixel.

Preferably, the inhomogeneous pretilt-angle distribution is selected as follows. The optimized pixel is partitioned into an outer region and an interior region, where the outer region is an area between the boundary of the optimized pixel and a pre-determined distance inwardly therefrom. The inhomogeneous pretilt-angle distribution is then selected by having one value of the pretilt angle over the outer region and another value of the pretilt angle over the interior region.

Alternatively, the inhomogeneous distribution of FFE-opposing feature may be selected such that over the pixel region of the optimized pixel, the optimized pixel gives a phase-retardation error in modulating the incident light to be within a pre-determined percentage of a required phase-retardation level under a first or second condition. The first condition is that the pixel electrode of the optimized pixel is applied with a pre-defined maximum operating voltage and the pixel electrodes of the neighboring pixels are applied with a pre-defined minimum operating voltage. The second condition is that the pixel electrode of the optimized electrode is applied with the pre-determined minimum operating voltage and the pixel electrodes of the neighboring pixels are applied with the pre-determined maximum operating voltage.

Optionally, the SLM further comprises a nanostructured alignment layer between the transparent electrode layer and the LC layer. The nanostructured alignment layer is patterned to form nanostructures thereon. Sizes and shapes of the nanostructures are determined for realizing the optimized pixel with the inhomogeneous distribution of FFE-opposing feature. The nanostructured alignment layer may be substantially composed of polyimide.

In one embodiment, the LC layer of the SLM includes a LC material, and a polymerized material formed by polymerization of a monomer for stabilizing the LC material. The polymerized material is formed by the monomer having an inhomogeneous distribution of polymerization degree over the pixel region of the optimized pixel for unevenly modifying the FFE-opposing feature over the pixel region of the optimized pixel. The inhomogeneous distribution of polymerization degree is selected to oppose the FFE. The LC layer may be formed by irradiating the monomer with a light beam having a gradient change in intensity to trigger and control polymerization of the monomer so as to realize the inhomogeneous distribution of polymerization degree. In one option, the inhomogeneous distribution of polymerization degree has a highest polymerization degree at a boundary of the optimized pixel's pixel region, and decreases towards a center thereof.

Other aspects of the present invention are disclosed as illustrated by the embodiments hereinafter.

DETAILED DESCRIPTION

An aspect of the present invention is to provide a SLM for modulating incident light where the SLM reduces a FFE by configuring a LC layer of the SLM to exhibit an inhomogeneous distribution of a pretilt angle or an anchoring energy over a pixel electrode without a need to modify a shape of the pixel electrode. For example, if a rectangular pixel electrode is used in an original design, the same rectangular pixel electrode can still be used after the present invention is applied to the original design.

Figure 1:
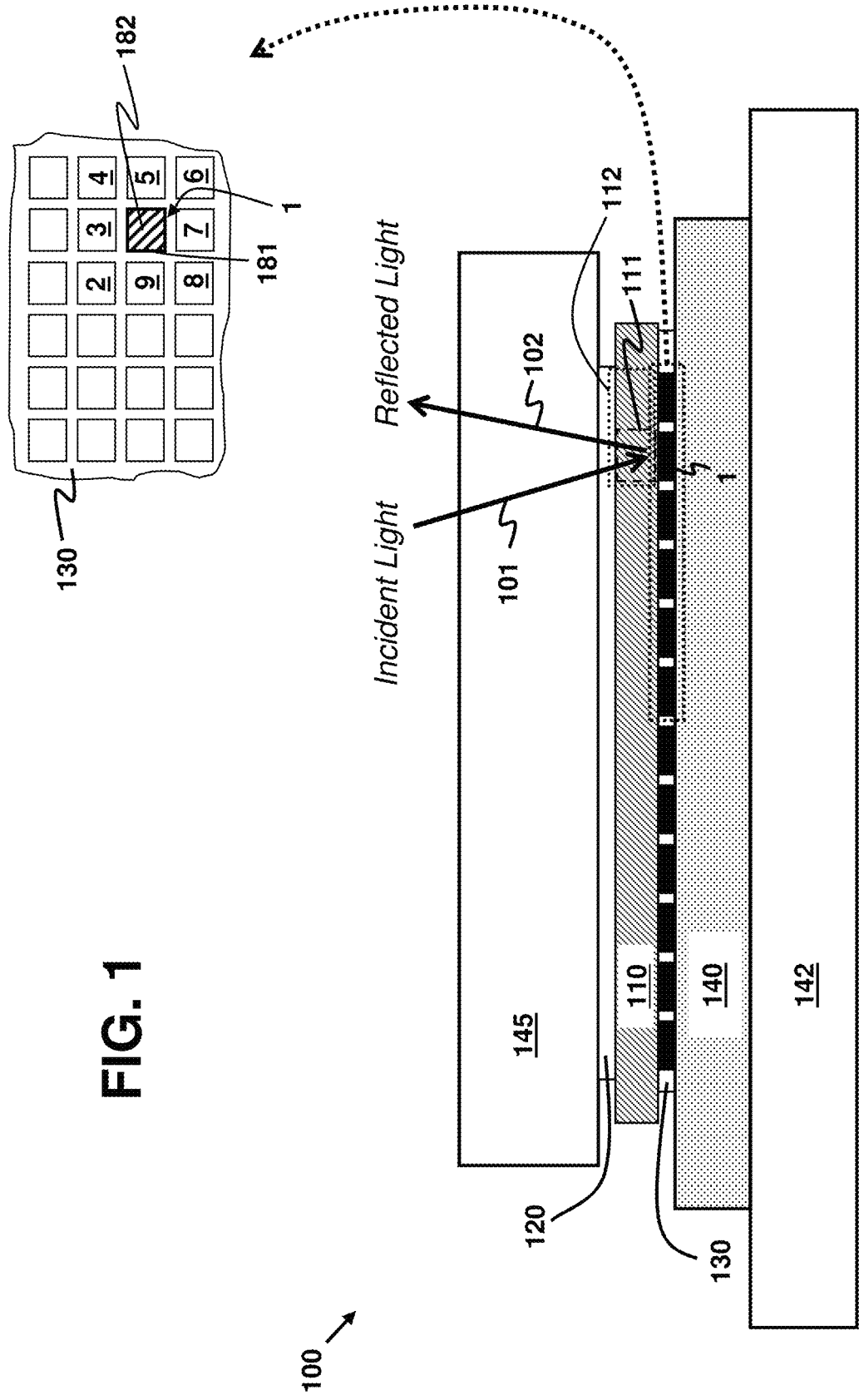
FIG. 1 depicts a structure of an exemplary SLM for illustrating the present invention.

FIG. 1 depicts a structure of an exemplary SLM 100 for illustrating the present invention. The SLM 100 comprises a transparent electrode layer 120, a reflecting electrode layer 130, and a LC layer 110 positioned between the transparent electrode layer 120 and the reflecting electrode layer 130. In particular, the reflecting electrode layer 130 comprises plural pixel electrodes (including pixel electrodes 1-9) arranged in an array, forming plural pixels each having a portion of the LC layer 110 over one pixel electrode. In one practical implementation, the reflecting electrode layer 130 is formed on a silicon substrate 140 such that the SLM 100 is a LCOS SLM. A rigid slab 142 such as a ceramic substrate or a metal slug may be used to mechanically support the silicon substrate 140 and the components thereon. Preferably, a glass slab 145 is installed on the transparent electrode layer 120 for offering mechanical protection thereto while allowing light to travel through to reach the LC layer 110 if the SLM 100 is intended to modulate visible light. It is known to those skilled in the art that indium tin oxide (ITO) can be used to form the transparent electrode layer 120. In most practical realizations, the LC layer 110 is homogeneous (with LC molecules therein aligned in a direction parallel to the transparent electrode layer 120), homeotropical (with the LC molecules aligned in a direction perpendicular to the transparent electrode layer 120) or twisted (with the LC molecules aligned in a helix-like structure).

Without loss of generality, consider only the pixel electrodes 1-9 as representative pixel electrodes for illustration. The pixel electrode 1 has a pixel region 182, which is an area bounded by a boundary 181 of the pixel electrode 1. A pixel 111 is formed on the pixel electrode 1 as a portion of the LC layer 110 overlaying the pixel region 182. As the pixel 111 is located on the pixel region 182, for simplicity, the pixel 111 has a pixel boundary that is also referenced as 181. An enlarged pixel 112 including the pixel 111 and one adjacent pixel is also defined. When an incident light ray 101 enters the pixels 111 and 112, the incident light ray 101 experiences an optical phase retardation with an amount depending on a voltage difference between the pixel electrode 1, 5 (or 3, 7, and 9) and the transparent electrode layer 120. When the incident light ray 101 reaches the pixel electrode 1, 5 (or 3, 7, and 9) the incident light ray 101 is reflected or diffracted to form a reflected or diffraction light ray 102. During traveling through the LC layer 110 again, the reflected or diffraction light ray 102 further experiences an additional phase retardation substantially close to the aforesaid amount. In total, a phase retardation close to two times of the aforesaid amount is provided.

Figure 2:
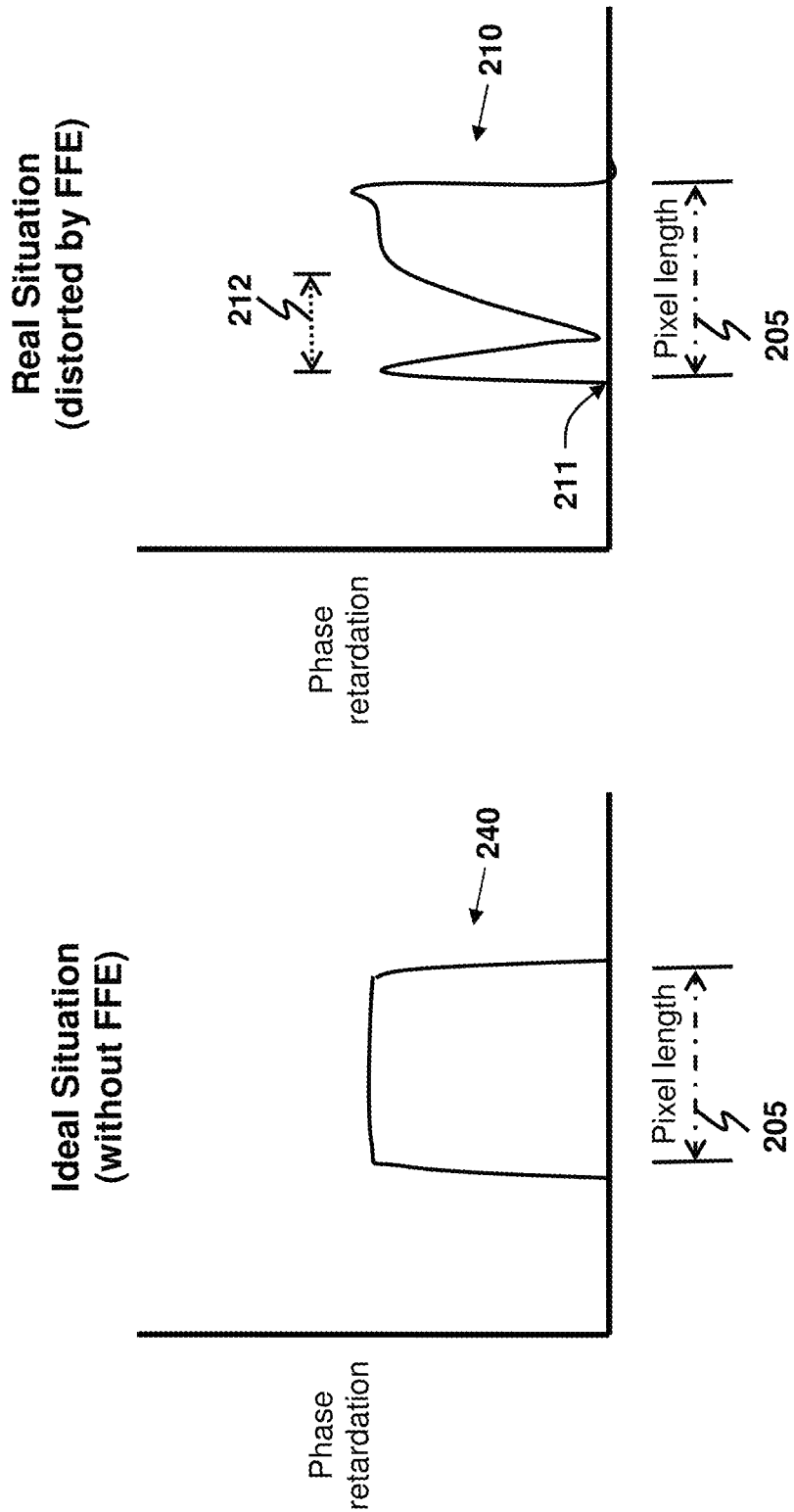
FIG. 2 depicts a typical distribution of phase retardation under the influence of a FFE, and an ideal phase-retardation distribution without being affected by the FFE.

The pixel 111 has neighboring pixels immediately adjacent to the pixel 111, where these neighboring pixels are formed as portions of the LC layer 110 on the pixel electrodes 2-9. When any one of the pixel electrodes 2-9 is applied with a voltage different from another voltage applied to the pixel electrode 1, a FFE that negatively affects the pixel 111 results. Consequently, the phase retardation produced by the pixel 111 becomes non-uniform over the pixel region 182, so that the pixel 111 has a two-dimensional uneven distribution of phase retardation. For simplicity and as an illustrative example, FIG. 2 depicts a one-dimensional, typical distribution 210 of phase retardation along a pixel length 205 under the influence of FFE, and an ideal phase-retardation distribution 240 without being affected by the FFE. When the typical distribution 210 is compared to the ideal one 240, it is seen that the FFE causes a great fluctuation in phase retardation over a certain affected portion 212 of the pixel length 205 near a pixel boundary 211. The Inventor has found that the phase-retardation fluctuation can be substantially reduced by micro-manipulating "a FFE-opposing feature" over the affected portion 212 to oppose the FFE. The FFE-opposing feature is a tunable property of the LC layer 110. As identified by the Inventor, a usable set of FFE-opposing features comprises a pretilt angle and an anchoring energy. The pretilt angle and the anchoring energy are related to an alignment density and an alignment strength of the LC, respectively. Both the alignment density and the alignment strength of the LC in turn determine the ability of the LC to resist against the FFE.

According to the present invention, at least one of the pixels in the LC layer 110 is realized as an optimized pixel, which is a pixel specifically configured to oppose the FFE based on micro-manipulating one selected FFE-opposing feature. Most preferably each of the pixels in the LC layer 110 is realized as the optimized pixel. In the description hereinafter, the pixel 111 on the pixel electrode 1 is taken as an exemplary pixel realized as the optimized pixel. An inhomogeneous distribution (i.e. a non-uniform distribution) of the selected FFE-opposing feature over the pixel region 182 is judiciously selected or determined to oppose the FFE induced by the neighboring pixels resided on the pixel electrodes 2-9.

Since the phase-retardation disturbance due to the FFE depends on voltages applied to the pixel electrodes 1-9, it is impractical to consider all possible combinations of the voltages in determining the inhomogeneous distribution of FFE-opposing feature over the pixel region 182. Since the FFE is most pronounced when the voltage difference between the pixel electrode 1 and the pixel electrode 2 (or any of the pixel electrodes 3-9) is greatest among all combinations of voltage difference, the inhomogeneous distribution of FFE-opposing feature is practically determined by considering one or a limited number of worst-case conditions. Generally, the SLM 100 is specified with a maximum operating voltage and a minimum operating voltage for driving each of the pixel electrodes 1-9. Two worst-case conditions can be obtained. A first worst-case condition is that the pixel electrode 1 is applied with the maximum operating voltage and the pixel electrodes 2-9 are applied with the minimum operating voltage. A second worst-case condition is the reverse of the first worst-case condition: the pixel electrode 1 is applied with the minimum operating voltage and the pixel electrodes 2-9 are applied with the maximum operating voltage. Usually, it is sufficient to consider only one of the first and second worse-case conditions in determining the inhomogeneous distribution of FFE-opposing feature. However, it is possible that considering both conditions in the determination is more advantageous, e.g., when the LC layer 110 exhibits hysteresis. After one or more worst-case conditions are selected to be considered in determining the inhomogeneous distribution of FFE-opposing feature, the inhomogeneous distribution of FFE-opposing feature can be determined.

In a first determining method, the inhomogeneous distribution of FFE-opposing feature is determined such that over the pixel region 182, the pixel 111 gives a phase-retardation error in modulating light to be within a pre-determined percentage of a required phase-retardation level under the selected one or more worst-case conditions. The phase-retardation error experienced at a location on the pixel region 182 is obtained, by measurement or computation, as an absolute value of the difference between the required phase-retardation level and a phase retardation actually provided to light incident on the aforementioned location. Although the first determining method is a general approach of determining the inhomogeneous distribution of FFE-opposing feature, there is no closed-form solution to computing the distribution and the distribution is often obtained through a recursive numerical algorithm. The involved computation load is often heavy.

It is advantageous to use a simpler method to determine the distribution. In a second determining method, the inhomogeneous distribution of FFE-opposing feature is more-directly determined by first identifying the affected portion 212 for the pixel 111 under the one or more worst-case conditions and then adjusting the FFE-opposing feature on the affected portion 212 to be different from the FFE-opposing feature outside the affected portion 212. The affected portion 212 can be identified by numerically evaluating the FFF on the LC layer 110 according to a computation model established in the art, e.g., the model used in K.-H. F. CHIANG, S.-T. WU and S.-H. CHEN, "Fringing Field Effect of the Liquid-Crystal-on-Silicon Devices," Japan Journal of Applied Physics, vol. 41 (2002), pp. 4577-4585, part 1, no. 7A, July 2002, the disclosure of which is incorporated by reference herein. The adjustment of the FFE-opposing feature on the affected portion 212 is done in a way to counteract the FFE as much as possible.

Figure 6:
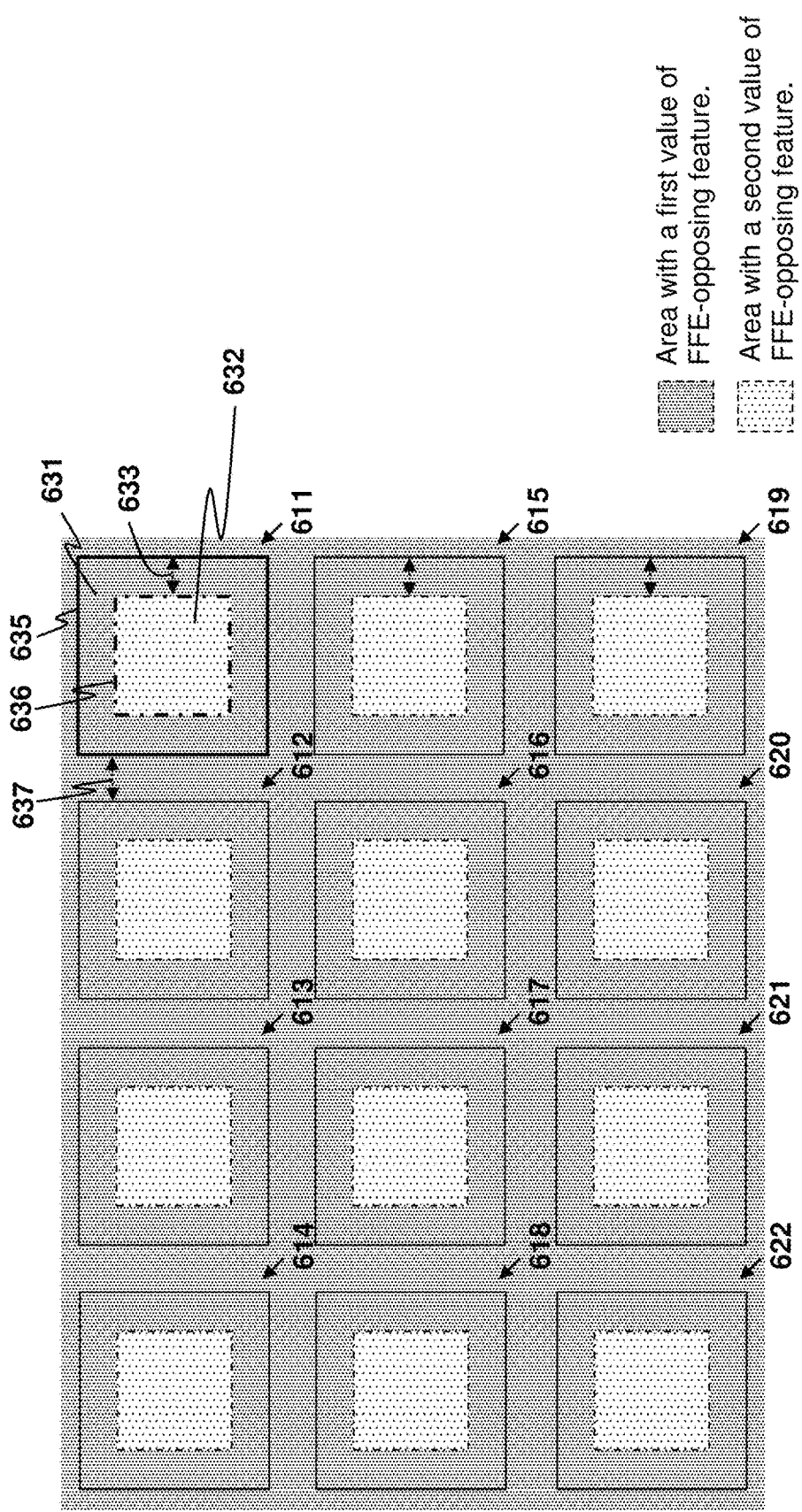
FIG. 6 depicts an illustrative example of inhomogeneous distribution of FFE-opposing feature, where each optimized pixel is partitioned into an outer region and an interior region, the two regions having different values of selected FFE-opposing feature.

Since the FFE affects the pixel 111 predominately near the pixel boundary 181, one may make a further simplification that the affected portion 212 for the pixel 111 is an outer region of the pixel 111, where the outer region is an area between the pixel boundary 181 and a certain distance inwardly therefrom. This certain distance can be estimated through computation or computer simulation. Thus, the inhomogeneous distribution of FFE-opposing feature is obtained by partitioning the pixel 111 into an outer region and an interior region, the outer region having one value for the FFE-opposing feature, the interior region having another value for the FFE-opposing feature. As an illustrative example, FIG. 6 depicts an inhomogeneous distribution of FFE-opposing feature for twelve optimized pixels 611-622. Take the optimized pixel 611 as a representative optimized pixel for illustration. The optimized pixel 611 has a pixel boundary 635. An outer region 631 of the optimized pixel 611 is formed as an area between the pixel boundary 635 and an imaginary line 636. The imaginary line 636 is located on the optimized pixel 611, and is positioned from the pixel boundary 635 by a distance 633. The distance 633 is determined such that the outer region 631 is an affected portion (namely, the affected portion 212 mentioned above). An interior region 632 is an area enclosed by the imaginary line 636. The optimized pixel 611 is configured such that the outer region 631 has a first value of FFE-opposing feature and the interior region 632 has a second value of FFE-opposing feature. Note that the optimized pixels 611-622 are formed on a continuous LC layer (e.g., the LC layer 110). Between two adjacent optimized pixels, there is an inter-pixel gap, for example, a gap 637 between the two optimized pixels 611, 612. Practically, the LC layer on the gap 637 may be configured to have the first value for the FFE-opposing feature. An additional discontinuity in FFE-opposing feature along the pixel boundary 635 can thus be avoided, and it might have a certain advantage in manufacturing.

Figure 3:
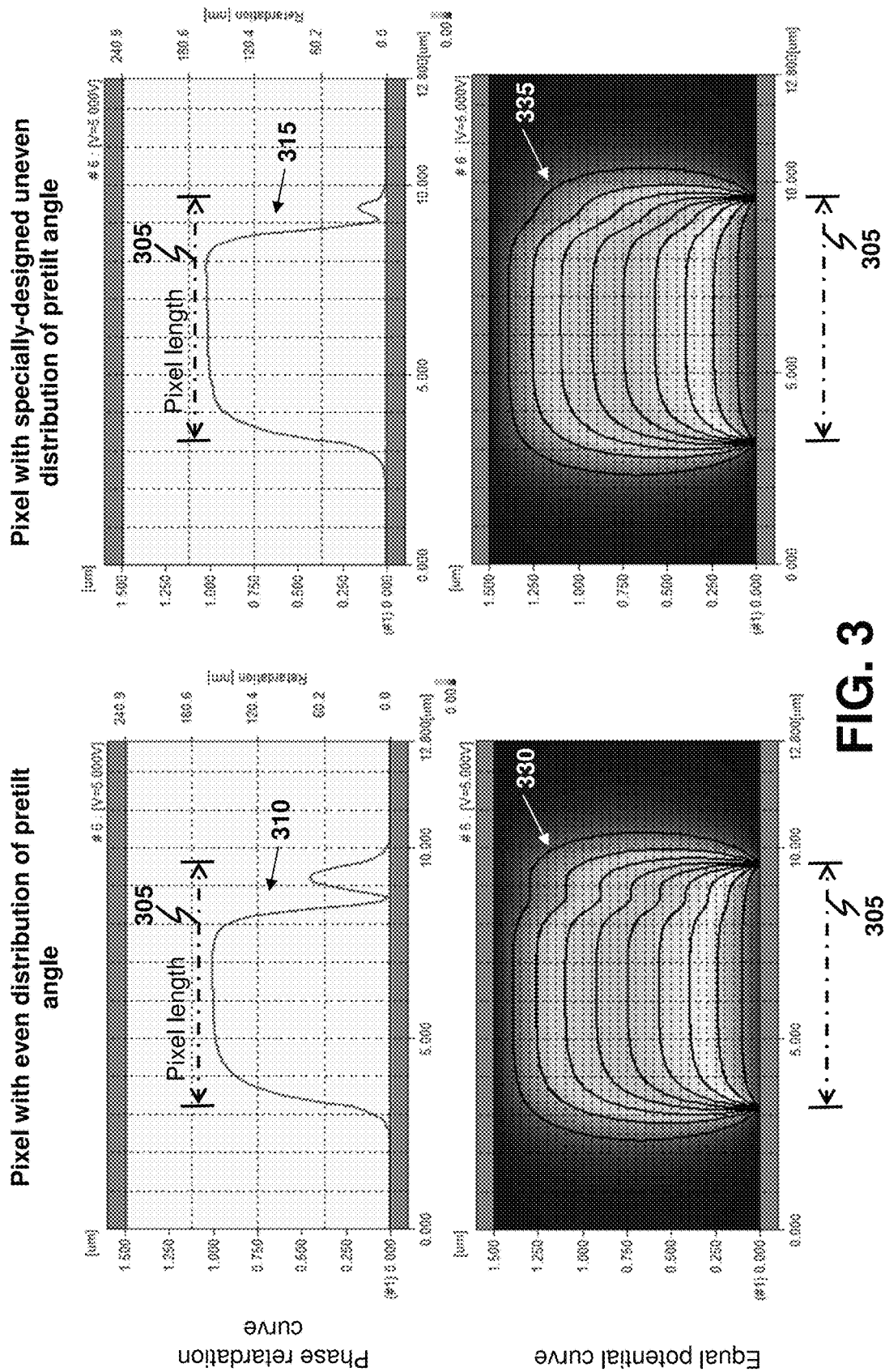
FIG. 3 demonstrates that the FFE can be effectively counteracted by an inhomogeneous distribution of pretilt angle.

FIG. 3 demonstrates that the FFE can be effectively counteracted by an inhomogeneous distribution of pretilt angle determined by the second determining method. In FIG. 3, phase retardation curves 310, 315 and equal potential curves 330, 335 over a pixel length 305 are plotted for a case of using an inhomogeneous pretilt-angle distribution and a reference case of using a uniform distribution. Computer simulation was used to obtain the curves 310, 315, 330, 335 under the following conditions: a pixel length of 6.2 µm; an inter-pixel gap of 0.2 µm; a worst-case voltage difference of 5V between two adjacent pixels; a pretilt angle of 85° over an outer region of the pixel, the outer region being bounded between a pixel boundary and 1 µm therefrom; and another pretilt angle of 88° on the remaining part of the pixel. It is apparent that the phase retardation curve 315 for the inhomogeneous pretilt-angle distribution has a flat region over the pixel length 305 longer than a corresponding flat region in the phase retardation curve 310 for the uniform-distribution case. Similar conclusion is also obtained when examining the equal potential curves 330, 335. The effectiveness of using the inhomogeneous pretilt-angle distribution determined by the second determining method is demonstrated.

Figure 4:
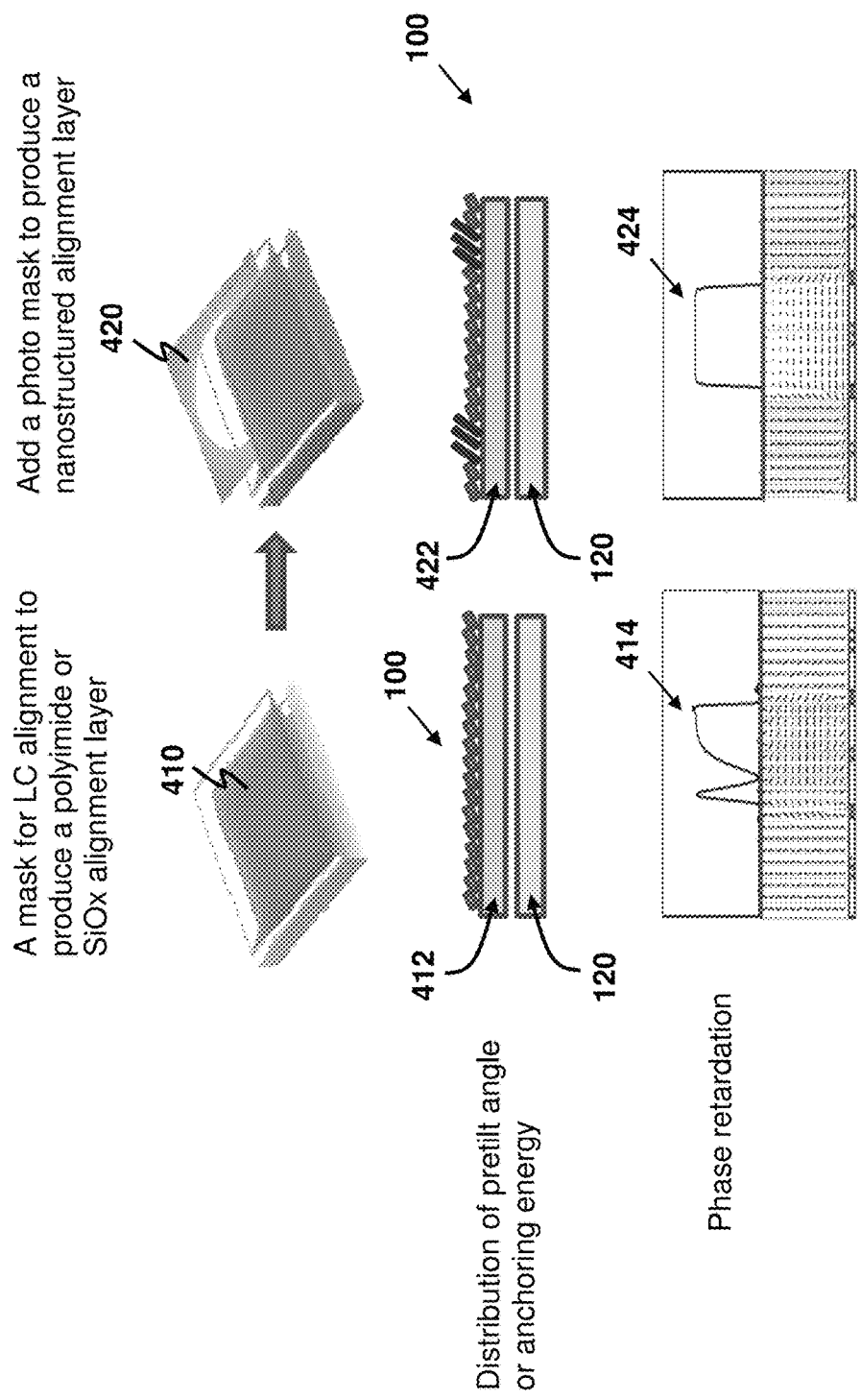
FIG. 4 illustrates that an additional photo mask or an E-beam treatment can be added in manufacturing the SLM to add nanostructures on an alignment layer to yield an inhomogeneous distribution of pretilt angle or anchoring energy.

After the inhomogeneous distribution of FFE-opposing feature is determined, it is necessary to configure the pixel 111 with this distribution. A nanostructured alignment layer can be added on the SLM 100 to modify the pretilt angle or the anchoring energy to have the inhomogeneous distribution that is determined. FIG. 4 depicts a process of manufacturing the nanostructured alignment layer. In manufacturing the SLM 100, an alignment layer 412 is usually added on the transparent electrode layer 120 to configure the LC in the pixel 111 (actually the LC layer 110) to have a predetermined pretilt angle over the entire pixel region 182. A photo mask 410 is used for forming the alignment layer 412, usually made of polyimide or silicon oxide, on the transparent electrode layer 120. The alignment layer 412 enables the pretilt angle or the anchoring energy of the LC in the pixel 111 to be substantially similar over the pixel region 182, thereby giving a phase-retardation curve 414 that is substantially distorted by the FFE. An additional mask 420, or an E-beam treatment, is added to pattern the alignment layer 412 such that nanostructures are formed on the alignment layer 412, thereby forming a nanostructured alignment layer 422. Sizes and shapes of the nanostructures on the nanostructured alignment layer 422 are determined to modify the pretilt angle or the anchoring energy in a way to realize the determined inhomogeneous distribution so as to give a desired phase-retardation curve 424 that is resistant to the FFE. For details on how to determine the sizes and structures of the nanostructures in modifying the pretilt angle or the anchoring energy, those skilled in the art can refer to references in the art, for example, "Variable Liquid Crystal Pretilt Angle using Nano-Alignment Surface," *SID*2012 *Digest*, pp. 289-292 (2012) and "Nanostructured alignment layers and their application," *EURODISPLAY*, pp. 135-138 (2009), the disclosures of both of which are incorporated by reference herein.

Figure 5:
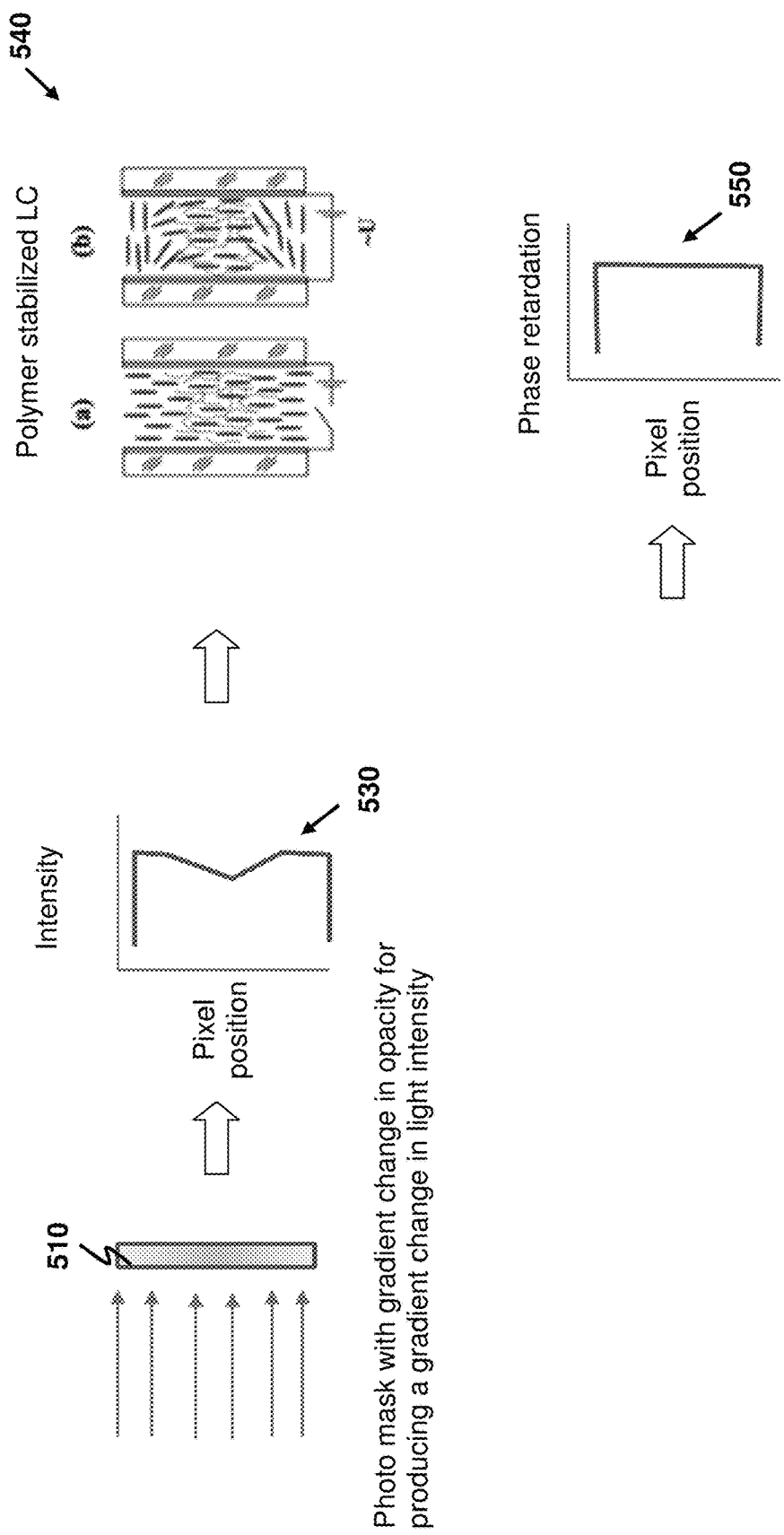
FIG. 5 depicts a process for manufacturing the SLM with the polymer stabilized network in order to achieve the inhomogeneous distribution of selected FFE-opposing feature.

Alternatively, a polymer stabilized network may be added to the LC layer 110 for modifying the FFE-opposing feature, i.e. the pretilt angle or the anchoring energy, to have the determined inhomogeneous distribution. FIG. 5 depicts a process for manufacturing the SLM with the polymer stabilized network. First, the LC layer 110 is prepared by blending a LC material and a monomer. The monomer is to be polymerized to from the polymer stabilized network for stabilizing the LC material. A photo mask 510 with a gradient change in opacity is used for producing a light beam 530 with a gradient change in intensity. The light beam 530 is used to trigger and control polymerization of the monomer in the LC layer 110. The monomer is irradiated with the light beam 530, forming a polymerized material in the LC layer 110. Since the light beam 530 has a gradient change in intensity, the monomer has experienced an inhomogeneous distribution of polymerization degree over the pixel region 182 of the pixel 111 in forming the polymerized material. The inhomogeneous distribution of polymerization degree is used for unevenly modifying the FFE-opposing feature of the LC layer 110 over the pixel region 182. In addition, the inhomogeneous distribution of polymerization degree is selected to oppose the FFE for achieving a phase-retardation curve 550 that is substantially uniform over the pixel region 182. Similar to the reasoning made in the above, generally the inhomogeneous distribution of polymerization degree has a highest polymerization degree at a boundary of the optimized pixel's pixel region, and decreases towards a center thereof. As a remark, the LC in the pixel 111 also experiences a gradient change of refractive index as a result of the inhomogeneous distribution of polymerization degree.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A spatial light modulator (SLM) for modulating incident light, comprising:
    a transparent electrode layer;
    a reflecting electrode layer comprising plural pixel electrodes, an individual pixel electrode having a pixel region bounded by a boundary of the individual pixel electrode; and
    a liquid crystal (LC) layer positioned between the transparent electrode layer and the reflecting electrode layer to create plural pixels, an individual pixel being formed as a portion of the LC layer overlaying the pixel region of the individual pixel electrode;
wherein:
    at least one of the pixels is realized as an optimized pixel;
    the portion of the LC layer in the optimized pixel has an inhomogeneous distribution of pretilt angle over the pixel region, the inhomogeneous pretilt-angle distribution being selected to counteract an unwanted phase shift to the incident light around the boundary of the optimized pixel due to a fringe field effect (FFE) induced by plural neighboring pixels immediately adjacent to the optimized pixel, wherein the FFE is caused by an electric field generated at the boundaries of the neighboring pixels leaking to the optimized pixel to affect an LC alignment thereof;
    the optimized pixel is partitioned into an outer region and an interior region, the outer region being an area between the boundary of the optimized pixel and a pre-determined distance inwardly therefrom; and
    the inhomogeneous pretilt-angle distribution has one value of the pretilt angle over the outer region and another value of the pretilt angle over the interior region.

2. The SLM of claim 1, wherein the inhomogeneous pretilt-angle distribution is selected such that over the pixel region of the optimized pixel, the optimized pixel gives a phase-retardation error in modulating the incident light to be within a pre-determined percentage of a required phase-retardation level under a first or second condition, the first condition being that the pixel electrode of the optimized pixel is applied with a pre-defined maximum operating voltage and the pixel electrodes of the neighboring pixels are applied with a pre-defined minimum operating voltage, the second condition being that the pixel electrode of the optimized pixel is applied with the pre-defined minimum operating voltage and the pixel electrodes of the neighboring pixels are applied with the pre-defined maximum operating voltage.

3. The SLM of claim 1, wherein each of the pixels is realized as the optimized pixel.

4. The SLM of claim 1, further comprising:
    a nanostructured alignment layer between the transparent electrode layer and the LC layer, wherein the nanostructured alignment layer is patterned to form nanostructures thereon, sizes and shapes of the nanostructures being determined for realizing the optimized pixel with the inhomogeneous pretilt-angle distribution.

5. The SLM of claim 4, wherein the nanostructured alignment layer is substantially composed of polyimide.

6. The SLM of claim 1, further comprising:
    a silicon substrate on which the reflecting electrode layer is formed.

* * * * *